United States Patent
Daum et al.

[11] 3,856,811
[45] Dec. 24, 1974

[54] 2-AMINOBENZIMIDAZOLE-1-CARBOXYLIC ACID KETONE OXIME ESTERS

[75] Inventors: Werner Daum, Krefeld-Bockum; Hans Scheinpflug; Paul-Ernst Frohberger, both of Leverkusen, all of Germany

[73] Assignee: Bayer Aktiengesellschaft, Leverkusen, Germany

[22] Filed: Aug. 3, 1972

[21] Appl. No.: 277,829

[30] Foreign Application Priority Data
Aug. 14, 1972  Germany............ 2140863

[52] U.S. Cl............. 260/309.2, 424/273
[51] Int. Cl............. C07d 49/38
[58] Field of Search............. 260/309.2

[56] References Cited
UNITED STATES PATENTS

| | | | |
|---|---|---|---|
| 3,399,212 | 8/1968 | Hoover et al. | 260/309.2 |
| 3,455,948 | 7/1969 | Stedman | 260/309.2 |
| 3,641,048 | 2/1972 | Dittmar | 260/309.2 |
| 3,647,817 | 3/1972 | Dittmar | 260/309.2 |

Primary Examiner—Natalie Trousof
Attorney, Agent, or Firm—Burgess, Dinklage & Sprung

[57] ABSTRACT

2-Aminobenzimidazole-1-carboxylic acid ketone oxime esters of the formula

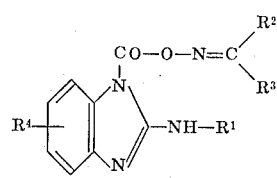

in which $R^1$ is hydrogen, —CO—O—$R^5$ or —CO—$R^6$, $R^2$ and $R^3$ each independently is lower alkyl or alkenyl, phenyl, cyano, or lower alkoxycarbonyl; or $R^2$ and $R^3$ together are alkylene of 4 to 10 carbon atoms, $R^4$ is hydrogen or alkyl of up to 8 carbon atoms, $R^5$ is alkyl or alkenyl with up to 10 carbon atoms, and $R^6$ is lower alkyl, which possess fungicidal, bactericidal, insecticidal and acaricidal properties.

10 Claims, No Drawings

2-AMINOBENZIMIDAZOLE-1-CARBOXYLIC ACID KETONE OXIME ESTERS

The present invention relates to and has for its objects the provision of particular new 2-aminobenzimidazole-1-carboxylic acid ketone oxime esters which possess fungicidal, bactericidal, insecticidal and acaricidal properties, active compositions in the form of mixtures of such compounds with solid and liquid dispersible carrier vehicles, and methods for producing such compounds and for using such compounds in a new way especially for combating pests, e.g., fungi, bacteria, insects and acarids, with other and further objects becoming apparent from a study of the within specification and accompanying examples.

As has long been known, the fungicides used in agriculture and in horticulture include zinc ethylene-1,2-bis-dithiocarbamate (Compound A) and N-trichloromethylthiotetrahydrophthalimide (Compound B); these compounds possess a great importance among the commercial products (cf. R. Wegler, "Chemie der Pflanzenschutz- und Schadlingsbekampfungsmittel," Volume 2, pages 65 and 108, Berlin/Heidelberg/New York (1970)). The activity in the case of low application concentrations is, however, not always satisfactory. The known active compound N-phenylcarbamic acid O-acetone oxime ester according to German published DAS No. 1,232,947 also possesses some herbicidal activity.

The present invention provides 2-aminobenzimidazole-1-carboxylic acid ketone oxime esters of the general formula

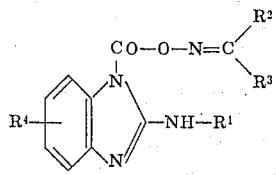

in which
- $R^1$ is hydrogen, $-CO-O-R^5$ or $-CO-R^6$,
- $R^2$ and $R^3$ each independently is lower alkyl or alkenyl, phenyl, cyano, or lower alkoxycarbonyl; or $R^2$ and $R^3$ together are alkylene of 4 to 10 carbon atoms,
- $R^4$ is hydrogen or alkyl of up to 8 carbon atoms,
- $R^5$ is alkyl or alkenyl with up to 10 carbon atoms, and
- $R^6$ is lower alkyl.

Preferably, $R^1$ is lower alkoxy or alkenoxycarbonyl, e.g. methoxy-, ethoxy-, isopropoxy- or allyloxycarbonyl; $R^2$ and $R^3$ each is methyl or ethyl, or together are butylene or pentylene; and $R^4$ is hydrogen or lower alkyl, especially butyl.

Surprisingly, the active compounds according to the invention show a fungicidal and bactericidal effectiveness superior to the previously known active compounds; also present is a distinct systemic-fungicidal activity. The active compounds according to the invention therefore represent an enrichment of the art.

As employed hereinabove formula I is also intended to embrace its tautomer

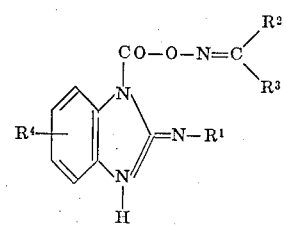

(Ib)

Similarly, the 2-aminobenzimidazole starting materials illustrated hereinbelow also embrace their corresponding tautomers.

The invention also provides a process for the production of a 2-aminobenzimidazole-1-carboxylic acid ketone oxime ester of the formula (I) in which a. a 2-aminobenzimidazole of the formula

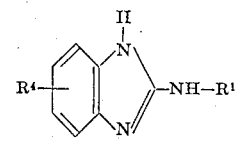

(II)

in which
$R^1$ and $R^4$ have the meanings stated above,
is reacted with a chloroformic acid O-ketone oxime ester of the formula

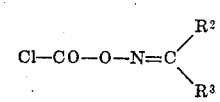

(III)

in which
$R^2$ and $R^3$ have the meanings stated above, or b. a 1-chlorocarbonyl-2-aminobenzimidazole of the formula

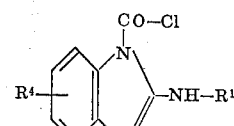

(IV)

in which
$R^1$ and $R^4$ have the meanings stated above is reacted with a ketone oxime of the formula

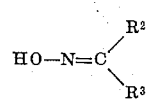

(V)

in which
$R^2$ and $R^3$ have the meanings stated above.

If 2-aminobenzimidazole and methyl ethyl ketone oxime O-chloroformic acid ester are used according to process variant (a) as starting materials, the reaction course is represented by the following scheme:

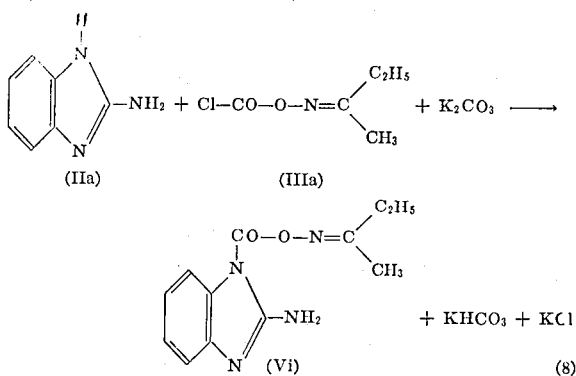

(8)

The reaction sequence according to process variant (b) can be represented by the following formula scheme:

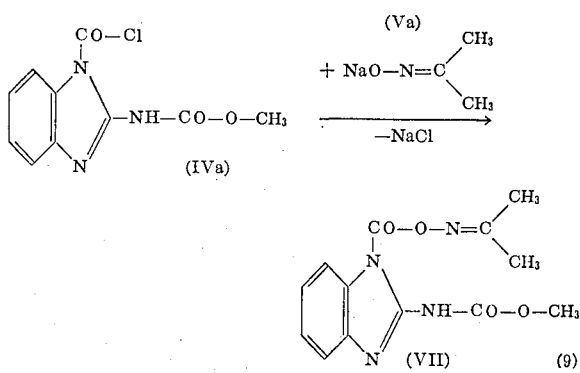

(9)

Examples of 2-aminobenzimidazoles to be used as starting materials for process variant (a) and defined by formula (II) include: 2-aminobenzimidazole; 2-amino-4-methyl-, -4-ethyl-, -4-propyl-, -4-isopropyl-, -4-butyl-, -4-isobutyl-, -4-sec.-butyl-, -4-tert.-butyl-benzimidazole, 2-amino-5-methyl-, -5-ethyl-, -5-propyl-, -5-isopropyl-, -5butyl-, -5-isobutyl-, -5-sec.-butyl-, -5-tert.-butyl-, -5-sec.-amyl-, -5-tert.-amyl-, -5-n-hexylbenzimidazole. The 2-aminobenzimidazoles are largely known or can be obtained according to known processes, e.g. according to U.S. Pat. No. 3,455,948. Many of the N-(benzimidazolyl-2')-carbamic acid alkyl and alkenyl esters deriving from 2-aminobenzimidazole are known, for example from J. Am. Chem. Soc. 56, 144-6 (1934) and U.S. Pat. Nos. 2,933,502 and 3,010,968; they can all be readily obtained in accordance with known general principles. Furthermore, benzimidazol-2-yl-carbamic acid esters can be prepared by reaction of 2-aminobenzimidazoles with alkyl- or alkenylcarbonic acid phenyl esters at elevated temperature according to the following reaction scheme:

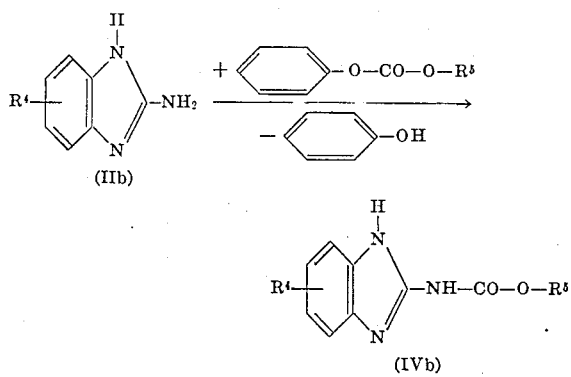

Many of the 2-acylaminobenzimidazoles also to be used as starting materials are known, for example from U.S. Pat. No. 3,336,191; they can all be readily obtained in accordance with known general principles. Furthermore, the 2-acylaminobenzimidazoles can be prepared according to a hitherto new process by reacting 2-aminobenzimidazoles according to the following reaction scheme with alkanoylphenyl esters, i.e., fatty acid phenyl esters (which may also be substituted), at elevated temperature, for example at 170°C, optionally in the presence of catalytic amounts of tertiary amines, with the splitting off of phenol:

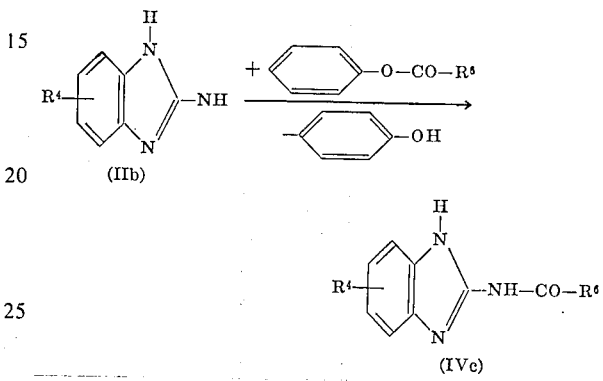

The chloroformic acid O-ketone oxime esters to be used as starting materials and defined by formula (III) include: acetone-, butanone-, pentanone-, methylisopropylketone-, methylisobutylketone-, mesityloxide-, phorone-, acetophenone-, propiophenone-, isobutyrophenone-, butyrophenone-, benzophenone-, cyclopentanone- and cyclohexanone oxime O-carbonic acid ester chloride. The compounds are disclosed in Belgian Pat. No. 709,182 and German Published DOS No. 1,809.385.

Suitable diluents in process variant (a) include inert organic solvents, such as acetone, methyl ethyl ketone, methylene chloride, chloroform, chlorobenzene, toluene, dioxane, tetrahydrofuran, acetonitrile, benzonitrile or ethyl acetate.

The reaction temperatures in process variant (a) can be varied within a fairly wide range. In general, the reaction is carried out at about −40 to +80°C, preferably at about -10°to +30°C.

The hydrogen chloride forming in reaction variant (a) is expediently bound by basic substances, such as triethylamine, dimethylbenzylamine, dimethylaniline, diethylaniline, pyridine, picoline, quinoline, potassium carbonate, sodium carbonate, sodium bicarbonate, borax or trilithium phosphate, or the 2-aminobenzimidazoles may be reacted with the chloroformic acid O-ketone oxime esters in the presence of water and an inert, water-immiscible solvent, such as methylene chloride or chloroform, or in the presence of a basic substance, such as sodium hydroxide solution, or one of the substances mentioned above, at a temperature between the freezing point of the aqueous solution and about +50°C, preferably up to 30°C, by adding the solution of the chloroformic acid O-ketone oxime ester, which solution according to German Published DOS No. 1,809,385 need not contain the pure product, to the mixture of the 2-aminobenzimidazole derivative with the solvents and the hydrogen chloride acceptors. It is also possible to work without additional basic substances and to bind the hydrogen chloride to the 2-aminobenzimidazole derivative or to the reaction products of the formula (I). The 2- aminobenzimidazole-1-carboxylic acid ketone oxime esters obtained are, in part, in crystalline form; in part, they remain dissolved in the organic solvent and must be separated by careful concentration of the solutions.

The 1-chlorocarbonyl-2-aminobenzimidazoles to be used as starting materials in process variant (b) and defined by the general formula (IV) can be prepared from the 2-aminobenzimidazoles corresponding to formula (II) and phosgene in the same general manner disclosed in French Pat. No. 1,523,597 and U.S. Pat. No. 3,541,213.

The ketone oximes required as starting materials in process variant (b) and defined by the formula (V) are generally known.

Process variant (b) is generally carried out in an inert solvent, for example ether, chloroform, methylene chloride, tetrahydrofuran or toluene. For this purpose, the 2-aminobenzimidazole derivative, in the presence of a tertiary base, preferably quinoline, may be reacted at low temperature with phosgene; filtration from the resultant hydrochloride of the tertiary amine may be effected and an alkali metal salt of the hydroxylamine derivative may then be allowed to act on the chloroformyl compound formed.

The active compounds accordiing to the invention exhibit a strong fungitoxic and bacteriotoxic activity. In the concentrations generally necessary for the control of fungi and bacteria, they do not harm cultivated plants and they have a low toxicity to warm-blooded animals. For these reasons, they are suitable for use as crop protection agents for the control of fungi and bacteria. Fungitoxic agents in crop protection are used for the control of Archimycetes, Phycomycetes, Ascomycetes, Basidiomycetes and *Fungi imperfecti*.

The active compounds accordng to the invention possess not only the good properties of existing commercial preparations but additionally exhibit considerable advantages. These lie primarily in the ability of the substances according to the invention to penetrate into the plant, to be conducted systemically and to act fungitoxically at a distance from the place of application. They can be taken up from the seed surface, from the roots and also from above-the-soil organs of plants after external application. Also, they possess an advantageous ability to come into action locosystemically, that is to exercise a deep effect in the plant tissue and eliminate fungal pathogenic agents which have already penetrated into the tissue of the host plant; they can therefore act curatively.

The active compounds according to the invention also show a protective activity against parasitary fungi and bacteria which infect above-the-soil parts of plants or attack plants from the soil. Further, they act against seed-borne pathogenic agents.

The active compounds according to the invention are particularly suitable for the control of *Venturia* species, e.g. apple scab and pear scab, of powdery mildew fungi such as *Podosphaera leucotricha* (powdery mildew of apples), *Erysiphe cichoracerum* and *Erysiphe graminis* and of pathogenic agents in rice, such as *Piricularia oryzae*, *Pellicularia saski* and *Xanthomonas oryzae*.

The active compounds according to the invention are likewise effective against *Botrytis cinerea*, *Mycosphaerella musicola*, *Cochliobolus miyabeanus*, *Cercospora* species and *Alternaria* species.

The active compounds according to the invention are highly effective and of particular practical importance when they are used as seed dressings or soil treatment agents against phytopathogenic fungi which adhere to the seed or occur in the soil and cause, in cultivated plants, seedlings diseases, root rots, tracheomycoses, stem, stalk, leaf, blossom, fruit or seed diseases, such as *Tilletia caries*, *Helminthosporium gramineum*, *Fusarium nivale*, *Fusarium culmorum*, *Rhizoctonia solani*, *Phialophora cinerescens*, *Verticillium alboratrum*, *Fusarium dianthi*, *Fusarium cubense*, *Fusarium oxysporum*, *Fusarium solani*, *Sclerotinia sclerotiorum*, *Thielaviopsis basicola* and *Phytophthora catorum*.

The active compounds also possess an insecticidal and acaricidal activity, e.g., against *Doralis fabae*, and the like.

The active compounds according to the instant invention can be utilized, if desired, in the form of the usual formulations or compositions with conventional inert (i.e., plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistance, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, keiselguhr, etc.) and ground synthetic minerals (e.g., highly dispersed silicic acid, silicates, e.g., alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, bactericides, insecticides and acaricides, or rodenticides, nematocides, herbicides, fertilizers, growth-regulating agents, etc., if desired, or in the form of particullar dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95%, and preferably 0.01–95% by weight of the mixture.

The active compounds can also be used in accordance with the well known ultra-low process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

In the case of seed treatment, there are required, in general, amounts of active compound of 0.1 to 10g per kg of seed, preferably 0.5 to 5g. For soil treatment, amounts of active compound of 1 to 500 g per cubic meter of soil, preferably 10 to 200g, are generally necessary.

Furthermore, the present invention contemplates methods of selectively killing, combating or controlling pests, e.g., fungi, bacteria, insects and acarids, and more particularly methods of combating at least one of fungi and bacteria, which comprises applying to at least one of correspondingly (a) such fungi, (b) such bacteria, (c) such insects, (d) such acarids, and (e) the corresponding habitat thereof, i.e., the locus to be protected, a correspondingly combative or toxic amount, i.e., a fungicidally, bactericidally, insecticidally or acaricidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

Example 1
Erysiphe test

| Solvent: | 4.7 parts by weight acetone |
|---|---|
| Emulsifier: | 0.3 part by weight alkylarylpolyglycol ether |
| Water: | 95 parts by weight |

The amount of the active compound required for the desired concentration in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus Erysiphe cichoracearum. The plants are subsequently placed in a greenhouse at 23°–24°C and at a relative atmospheric humidity of about 75%.

After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results can be seen from the following Table:

TABLE 1
Erysiphe test

| Active compound | | Infection as a percentage of the infection of the untreated control with a concentration of active compound of 0.0062% |
|---|---|---|
| S elemental ("wettable sulfur") (known) | (C) | 100 |
| [indole-carbamate structure with CO—O—N—C(CH₃)₂ and —NH—CO—O—CH₃] | (9) | 27 |
| [indole-carbamate structure with CO—O—N=C(CH₃)₂ and —NH—CO—O—C₂H₅] | (11) | 33 |

TABLE 1 – Continued
Erysiphe test

| Active compound | | Infection as a percentage of the infection of the untreated control with a concentration of active compound of 0.0062% |
|---|---|---|
| 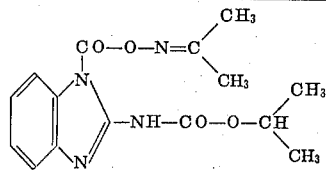 | (12) | 30 |
| 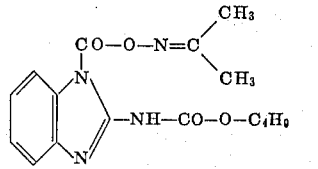 | (14) | 60 |
| 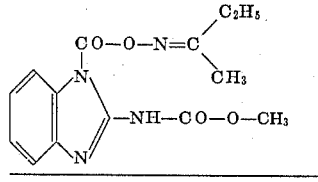 | (10) | 23 |

Example 2
Erysiphe test/systemic

| Solvent: | 4.7 parts by weight acetone |
|---|---|
| Emulsifier: | 0.3 part by weight alkylarylpolyglycol ether |
| Water: | 95 parts by weight |

The amount of the active compound required for the desired concentration of active compound in the liquid to be used for watering is mixed with the stated amount of the solvent, and the concentrate is diluted with the stated amount of water containing the stated additions.

Cucumber plants grown in standard soil are, in the 1–2 leaf stage, watered, within one week, once with 20 cc of the liquid to be used for watering, in the stated concentrations of active compound, with reference to 100 cc of soil.

The plants so treated are, after treatment, inoculated with conidia of the fungus *Erysiphe cichoracearum*. The plants are subsequently placed in a greenhouse at 23°–24°C and at a relative atmospheric humidity of about 70%. After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results can be seen from the following Table:

TABLE 2
Erysiphe test/systemic

| Active compound | | Infection as a percentage of the infection of the untreated control with a concentration of active compound of 30 p.p.m. |
|---|---|---|
| 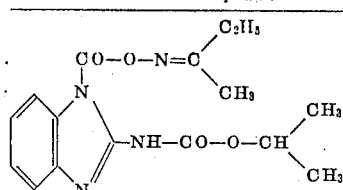 | (13) | 0 |

TABLE 2 – Continued
Erysiphe test/systemic

| Active compound | | Infection as a percentage of the infection of the untreated control with a concentration of active compound of 30 p.p.m. |
|---|---|---|
| 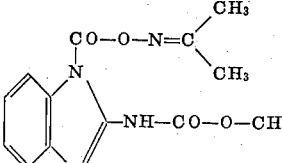 | (9) | 0 |
| 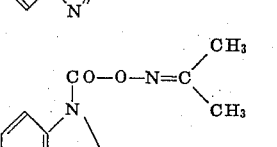 | (11) | 0 |
| 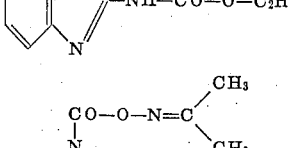 | (12) | 0 |
| 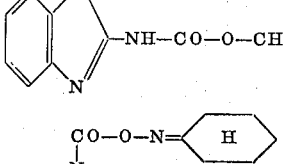 | (17) | 0 |

EXAMPLE 3

Powdery mildew of barley test (*Erysiphe graminis* var. *hordei*)/systemic (fungal disease of shoots of cereals)

Application of the active compounds take place as pulverulent seed treatment agents. They are produced by extending the active compound concerned with a mixture of equal parts by weight of talc and kieselguhr to give a finely powdered mixture with the desired concentration of active compound.

For seed treatment, barely seed is shaken with the extended active compound in a closed glass pack. The seed, in 3 batches each of 12 grains, is sown 2 cm deep, in a mixture of one part by volume of quartz sand, in flowerpots. Germination and emergence take place under favorable conditions in a greenhouse. 7 days after sowing, when the barley plants have unfolded their first leaf, they are dusted with fresh spores of *Erysiphe graminis* var. *hordei* and further cultivated at 21° to 22°C and 70% relative atmospheric humidity and 16 hours exposure to light. Within 6 days the typical mildew pustules form on the leaves.

The degree of infection is expressed as a percentage of the infection of the untreated control plants. Thus, 0% denotes no infection, and 100% denotes the same degree of infection as in the case of the untreated control. The lower the mildew infection, the more effective is the active compound.

The active compounds, the concentrations of active compound in the seed treatment agent as well as the applied amount thereof and the mildew infection as a percentage can be seen from the following Table:

TABLE 3

Powdery mildew of barley test (*Erysiphe graminis* var. *hordei*)/systemic

| Active compound | | Concentration of active compound in the dressing in percent by weight | Applied amount of dressing in g./kg. seed | Infection as a percentage of the untreated control |
|---|---|---|---|---|
| Untreated | | | | 100 |
| 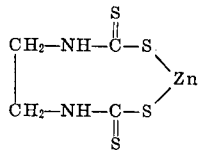 (known) | (A) | 30 | 10 | 100 |
| 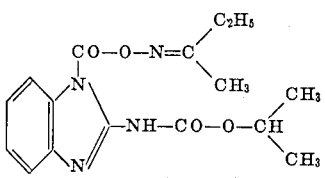 | (13) | 30 | 10 | 0 |
| 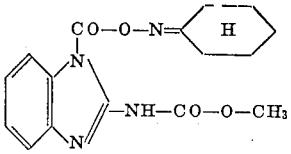 | (17) | 30 | 10 | 0 |

Example 4

*Podosphaera* test (powdery mildew of apples) [Protective]

| | |
|---|---|
| Solvent: | 4.7 parts by weight acetone |
| Emulsifier: | 0.3 part by weight alkylarylpolyglycol ether |
| Water: | 95 parts by weight |

The amount of active compound required for the desired concentration of the active compound in the spray liquid is mixed with the stated amount of solvent, and the concentrate is diluted with the stated amount of water which contains the stated additions.

Young apple seedlings in the 4-6 leaf stage are sprayed with the spray liquid until dripping wet. The plants remain in a greenhouse for 24 hours at 20°C and at a relative atmospheric humidity of 70%. They are then inoculated by dusting with conidia of the apply powdery mildew causative organism (*Podosphaera leucotricha Salm.*) and placed in a greenhouse at a temperature of 21°–23°C and at a relative atmospheric humidity of about 70%.

Ten days after the inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from the following Table:

TABLE 4

Podeosphaera test/protective

| Active compound | | Infection as a percentage of the infection of the untreated control with a concentration of active compound of— | |
|---|---|---|---|
| | | 0.0062% | 0.00156% |
| S elemental (wettable sulfur) (known) | (C) | 48 | 100 |
|  | (13) | 0 | 3 |
|  | (9) | 0 | 1 |
|  | (11) | 0 | 13 |

TABLE 4—Continued
Podeosphaera test/protective

| Active compound | | Infection as a percentage of the infection of the untreated control with a concentration of active compound of— | |
|---|---|---|---|
| | | 0.0062% | 0.00156% |
| [benzimidazole structure with CO-O-N=C(CH$_3$)$_2$ and NH-CO-O-CH(CH$_3$)$_2$] | (12) | 0 | 3 |
| [benzimidazole structure with CO-O-N=C(CH$_3$)$_2$ and NH-CO-O-C$_4$H$_9$] | (14) | 29 | 61 |
| [benzimidazole structure with CO-O-N=C(C$_2$H$_5$)(CH$_3$) and NH-CO-O-CH$_3$] | (10) | 1 | 13 |
| [methyl-substituted benzimidazole with CO-O-N=C(CH$_3$)$_2$ and NH-CO-O-CH$_3$] | (16) | 43 | 68 |
| [benzimidazole with CO-O-N=cyclohexyl(H) and NH-CO-O-CH$_3$] | (17) | 1 | 19 |
| [C$_4$H$_9$-substituted benzimidazole with CO-O-N=C(CH$_3$)$_2$ and NH-CO-O-CH$_3$] | (18) | 40 | 56 |

Example 5
*Fusicladium* test (apple scab) (Protective)

Solvent: 4.7 parts by weight acetone
Emulsifier: 0.3 part by weight alkylarylpolyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young applie seedlings in the 4–6 leaf stage are sprayed with the spray liquid until dripping wet. The plants remain in a greenhouse for 24 hours at 20°C and at a relative atmospheric humidity of 70%. They are then inoculated with an aqueous conidium suspension of the apple scab causative organism (*Fusicladium dendriticum Fuckel*) and incubated for 18 hours in a humidity chamber at 18° – 20°C and at a relative atmospheric humidity of 100%.

The plants then again come into a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results can be seen from the following Table:

TABLE 5
Fusicladium test/protective

| Active compound | | Infection as a percentage of the infection of the untreated control with a concentration of active compound of 0.00039% |
|---|---|---|
| [cyclohexene dicarboximide with N-S-CCl$_3$] (known) | (B) | 69 |
| [benzimidazole with CO-O-N=C(C$_2$H$_5$)(CH$_3$) and NH-CO-O-CH(CH$_3$)$_2$] | (13) | 37 |
| [benzimidazole with CO-O-N=C(CH$_3$)$_2$ and NH-CO-O-CH$_3$] | (9) | 39 |
| [benzimidazole with CO-O-N=C(CH$_3$)$_2$ and NH-CO-O-C$_2$H$_5$] | (11) | 41 |
| [benzimidazole with CO-O-N=C(CH$_3$)$_2$ and NH-CO-O-CH(CH$_3$)$_2$] | (12) | 63 |
| [benzimidazole with CO-O-N=C(CH$_3$)$_2$ and NH-CO-O-C$_4$H$_9$] | (14) | 59 |

TABLE 5—Continued
Fusicladium test/protective

| Active compound | | Infection as a percentage of the infection of the untreated control with a concentration of active compound of 0.00039% |
|---|---|---|
| benzimidazole with CO—O—N=C(C2H5)(CH3) on N1 and NH—CO—O—CH3 on C2 | (10) | 41 |
| benzimidazole with CO—O—N=cyclohexyl(H) on N1 and NH—CO—O—CH3 on C2 | (17) | 25 |
| benzimidazole with CO—O—N=C(CH3)2 on N1, NH—CO—O—CH3 on C2, and C4H9 on ring | (18) | 41 |

Example 6
*Fusicladium* test (systemic)

| | |
|---|---|
| Solvent: | 4.7 parts by weight acetone |
| Emulsifier: | 0.3 parts by weight alkylarylpolyglycol ether |
| Water: | 95 parts by weight |

The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3 – 4 leaf stage, watered once in one week with 20 cc of the liquid to be used for watering, in the stated concentration of active compound, with reference to 100 cc of soil.

The plants so treated are, after the treatment, inoculated with an aqueous conidium suspension of *Fusicladium dendriticum* Fuckel and incubated for 18 hours in a humidity chamber at 18° – 20 C and at a relative atmospheric humidity of 100%. The plants than again come into a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results can be seen from the following Table:

TABLE 6
Fusicladium test/systemic

| Active compound | | Infection as a percentage of the infection of the untreated control with a concentration of active compound of 15 p.p.m. |
|---|---|---|
| benzimidazole with CO—O—N=C(C2H5)(CH3) on N1 and NH—CO—O—CH(CH3)2 on C2 | (13) | 0 |
| benzimidazole with CO—O—N=C(CH3)2 on N1 and NH—CO—O—CH3 on C2 | (9) | 0 |
| benzimidazole with CO—O—N=C(CH3)2 on N1 and NH—CO—O—CH(CH3)2 on C2 | (12) | 0 |
| benzimidazole with CO—O—N=C(C2H5)(CH3) on N1 and NH—CO—O—CH3 on C2 | (10) | 0 |
| benzimidazole with CO—O—N=cyclohexyl(H) on N1 and NH—CO—O—CH3 on C2 | (17) | 0 |

Example 7
*Piricularia* and *Pellicularia* test

| | |
|---|---|
| Solvent: | 1.9 parts by weight dimethyl formamide |
| Dispersing agent: | 0.1 part by weight alkylarylpolyglycol ether |
| Water: | 98 parts by weight |

The amount of active compound required for the desired concentration of active compound in the spray liquor is mixed with the stated amount of solvent and of the dispersing agent, and the concentrate is diluted with the stated amount of water.

2 batches each consisting of 30 rice plants about 2 – 4 weeks old are sprayed with the spray liquor until dripping wet. The plants remain in a greenhouse at temperatures of 22° – 24°C and a relative atmospheric humidity of about 70% until they are dry. One batch of the plants is then inoculated with an aqueous suspension of 100,000 to 200,000 spores/ml of *Piricularia oryzae* and placed in a chamber at 24° – 26°C and 100% relative atmospheric humidity. The other batch of the plants is infected with a culture of *Pellicularia sasakii* grown on malt agar and placed at 28° – 30°C and 100% relative atmospheric humidity.

5 – 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; 100% means that the infection is exactly as great in the case of the control plants. s The active compounds, the concentration of the active compounds and the results can be seen from the following Table:

TABLE 7

Piricularia (a) and Pellicularia (b) test

| Active compound | | | Infection as a percentage of the infection of the untreated control with a concentration of active compound of (percent) | | | |
|---|---|---|---|---|---|---|
| | | | a | | b | |
| | | | 0.05 | 0.025 | 0.05 | 0.027 |
|  (known) | (B) | Pr.<br>Cur. | 100<br>100 | --------<br>-------- | 100<br>-------- | ------<br>------ |
| 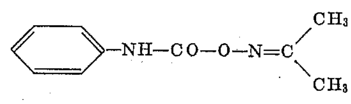  (known) | (D) | Pr. | 100 | -------- | 100 | ------ |
| 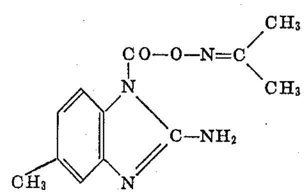  | (3) | Pr. | -------- | -------- | 0 | ------ |
| 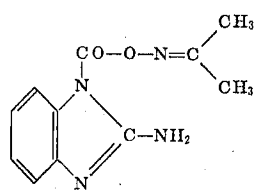  | (1) | Pr. | 25 | -------- | 12 | ----- |
| 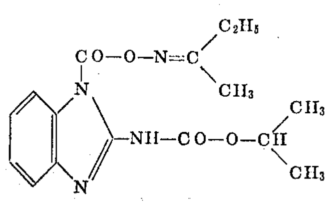  | (13) | Pr.<br>Cur. | 0<br>0 | 0<br>25 | 0<br>------ | 0<br>------ |
| 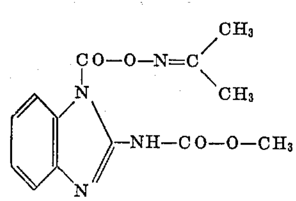  | (9) | Pr.<br>Cur. | 0<br>0 | 0<br>-------- | 50<br>-------- | ------<br>------ |
| 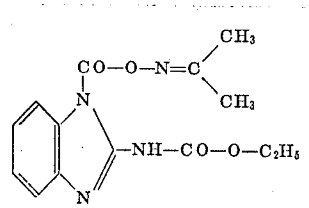  | (11) | Pr.<br>Cur. | 0<br>0 | 0<br>0 | 25<br>------ | ------<br>------ |

TABLE 7—Continued
Piricularia (a) and Pellicularia (b) test

| Active compound | | Infection as a percentage of the infection of the untreated control with a concentration of active compound of (percent) | | | |
| --- | --- | --- | --- | --- | --- |
| | | a | | b | |
| | | 0.05 | 0.025 | 0.05 | 0.025 |
| (compound with CO-O-N=C(CH3)2 and NH-CO-O-CH(CH3)2) | (12) Pr. | 0 | | 25 | |
| (compound with CO-O-N=C(C2H5)(CH3) and NH-CO-O-CH3) | (10) Pr. | 0 | 0 | 0 | 0 |
| (compound with CO-O-N=C(CH3)2 and NH-CO-O-CH3, with CH3 on ring) | (16) Pr. | 0 | 0 | 0 | |
| (compound with CO-O-N=cyclohexyl and NH-CO-O-CH3) | (17) Pr. | 0 | 17 | 13 | 25 |
| | Cur. | 25 | | | |
| (compound with CO-O-N=C(CH3)2 and NH-CO-O-CH3, with C4H9 on ring) | (18) Pr. | 25 | | | |
| (compound with CO-O-N=C(CH3)2 and NH-CO-CH3) | (19) Pr. | 25 | | 25 | |

Example 8
Bacteria test/*Xanthomonas oryzae*

| | |
| --- | --- |
| Solvent: | 1.9 parts by weight DMF |
| Dispersing agent: | 0.1 part by weight alkylarylpolyglycol ether |
| Water: | 98 parts by weight |

The amount of active compound necessary for the desired concentration of active compound in the spray liquor is mixed with the stated amount of solvent and of the dispersing agent, and the concentrate is diluted with the stated amount of water.

30 rice plants about 30 days old are sprayed with the spray liquor until dripping wet. The plants remain in a greenhouse at temperature of 22° to 24°C and a relative atmospheric humidity of about 70% until they are dry. Needles are then dipped into an aqueous bacteria suspension of *Xanthomonas oryzae* and the plants are inoculated by pricking the leaves. After inoculation, the plants stand in a chamber at 26° to 28°C and 80% relative atmospheric humidity.

10 days after inoculation, the infection in the case of all the inoculated leaves injured by pricking, inoculated, and previously treated with preparation is determined as a percentage of the untreated but likewise inoculated leaves of the control plants. 0% denotes no infection: 100% means that the infection is exactly as great as in the case of the control plants.

The active compounds, the concentrations of active compound and the results can be seen from the following Table:

TABLE 8
Bacteria test/*Xanthomonas Oryzae*

| Active compound | | Infection as a percentage of the infection of the untreated control with a concentration of active compound (in percent) of 0.05 |
|---|---|---|
| benzimidazole with CO—O—N=C(CH$_3$)$_2$ and C—NH$_2$ groups | (1) | 14 |
| benzimidazole with CO—O—N=C(C$_2$H$_5$)(CH$_3$) and NH—CO—O—CH(CH$_3$)$_2$ groups | (13) | 25 |

Example 9

Mycelium growth test
Nutrient medium used:

| | |
|---|---|
| 20 | parts by weight agar-agar |
| 200 | parts by weight potato decoction |
| 5 | parts by weight malt |
| 15 | parts by weight dextrose |
| 5 | parts by weight peptone |
| 2 | parts by weight disodium phosphate |
| 0.3 | parts by weight calcium nitrate |
| | Composition solvent mixture |
| 0.19 | parts by weight dimethyl formamide |
| 0.01 | parts by weight alkylarylpolyglycol ether |
| 1.80 | parts by weight water |
| 2.00 | parts by weight solvent mixture |

Proportion of solvent mixture to nutrient medium:
2 parts by weight solvent mixture
100 parts by weight agar nutrient medium The amount of active compound required for the desired concentration of active compound in the nutrient medium is mixed with the stated amount of solvent mixture. The concentrate is thoroughly mixed, in the stated proportion, with the liquid nutrient medium which has been cooled to 42°C and is then poured into Petri dishes of 9 cm diameter. Control dishes to which the preparation has not been added are also set up.

When the nutrient medium has cooled and solidified, the dishes are inoculated with the species of fungi stated in the Table and incubated at about 21°C.

Evaluation is carried out after 4 – 10 days, dependent upon the speed of growth of the fungi. When evaluation is carried out, the radial growth of the mycelium on the treated nutrient media is compared with the growth on the control nutrient medium. In the evaluation of the fungus growth, the following characteristic values are used:

| | |
|---|---|
| 0 | no fungus growth |
| 1 | very strong inhibition of growth |
| 2 | medium inhibition of growth |
| 3 | slight inhibition of growth |
| 4 | growth equal to the untreated control. |

The active compounds, the concentrations of the active compounds and the results can be seen from the following Table:

TABLE 9
Mycelium growth test

| Active compound | | Concentration of active compound, p.p.m. | *Piricularia oryzae* | *Phialophora cinerescens* | *Pellicularia sasakii* | *Mycosphaerella musicola* | *Verticillium alboatrum* | *Fusarium dianthi* | *Cochliobolus miyabeanus* | *Colletotrichum coffeanum* |
|---|---|---|---|---|---|---|---|---|---|---|
| phthalimide with N—S—CCl$_3$ (known) | (B) | 10 | 1 | 4 | 4 | 2 | 4 | 4 | 4 | 0 |
| benzimidazole with CO—O—N=C(C$_2$H$_5$)(CH$_3$) and NH—CO—O—CH(CH$_3$)$_2$ | (13) | 10 | 0 | 0 | 0 | 0 | 0 | 0 | 4 | 0 |
| benzimidazole with CO—O—N=C(CH$_3$)$_2$ and NH—CO—O—CH$_3$ | (0) | 10 | 0 | 0 | 0 | 0 | 0 | 0 | 4 | 0 |

TABLE 9 – Continued
Mycelium growth test
| Active compound | | Concentration of active compound, p.p.m. | Piricularia oryzae | Phialophora cinerescens | Pellicularia sasakii | Mycosphaerella musicola | Verticillium alboatrum | Fusarium dianthi | Cochliobolus miyabeanus | Colletotrichum coffeanum |
|---|---|---|---|---|---|---|---|---|---|---|
| 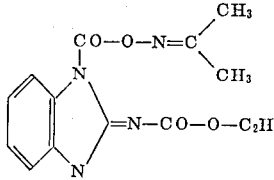 | (11) | 10 | 0 | 0 | 0 | 0 | 0 | 0 | 4 | 0 |
| 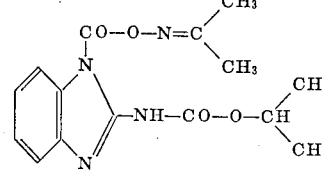 | (12) | 10 | 0 | 0 | 0 | 0 | 0 | 0 | 4 | 0 |
| 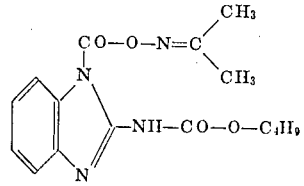 | (14) | 10 | 0 | 0 | 4 | 0 | 0 | 0 | 4 | 0 |
| 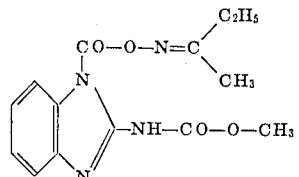 | (10) | 10 | 0 | 0 | 0 | 0 | 0 | 0 | 4 | 0 |
| 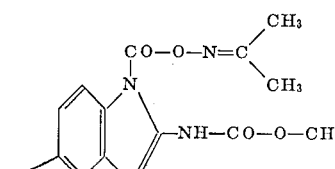 | (16) | 10 | 0 | 0 | 0 | 0 | 0 | 0 | 4 | 0 |
| 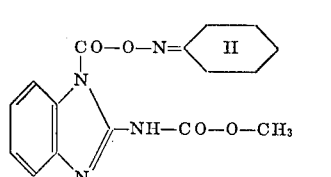 | (17) | 10 | 0 | 0 | 1 | 0 | 0 | 0 | 4 | 0 |
| 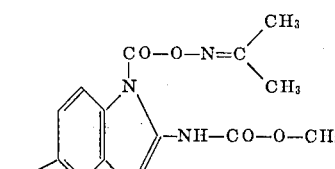 | (18) | 10 | 0 | 0 | 2 | 0 | 4 | 4 | 4 | 0 |
| 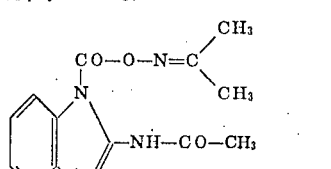 | (19) | 10 | 3 | 0 | 4 | 0 | 2 | 4 | 4 | 0 |

Example 10

Agar plate test
Test for fungitoxic effectiveness and breadth of the activity spectrum.

| Solvent: | Acetone | |
|---|---|---|
| Parts by weight: | a) 1000 | b) 100 |

To produce a suitable preparation of the active compound, 1 part by weight of the active compound is taken up in the stated amount of solvent.

The preparation of the active compound is added to potato dextrose agar which has been liquefied by heating in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. 0 means no mycelium growth, either on the treated substrate or on the inoculum, the symbol − means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 10
Agar plate test

| Active compound | | Concentration of active compound in the substrate, mg./l. | Corticium rolfsii | Sclerotinia sclerotiorum | Thielaviopsis basicola | Phytophthora cactorum | Fusarium culmorum | Fusarium oxysporum | Fusarium solani f. pisi |
|---|---|---|---|---|---|---|---|---|---|
| Untreated | | | + | + | + | + | + | + | + |
| (A) (known) | (a) | 10 | + | + | + | + | + | + | + |
|  | (b) | 100 | 0 | + | + | 0 | − | 0 | + |
| (13) | (a) | 10 | + | − | − | + | − | − | + |
|  | (b) | 100 | + | − | 0 | + | − | 0 | + |
| (9) | (a) | 10 | + | + | 0 | + | 0 | + | + |
|  | (b) | 100 | + | + | 0 | + | 0 | + | + |
| (11) | (a) | 10 | + | + | 0 | + | 0 | 0 | + |
|  | (b) | 100 | + | + | 0 | + | 0 | 0 | + |
| (12) | (a) | 10 | + | 0 | 0 | + | 0 | + | + |
|  | (b) | 100 | + | 0 | 0 | + | 0 | 0 | + |
| (14) | (a) | 10 | + | 0 | 0 | + | 0 | + | + |
|  | (b) | 100 | + | 0 | 0 | + | 0 | 0 | + |

TABLE 10—Continued

Agar plate test

| Active compound | | Concentration of active compound in the substrate, mg./l. | Corticium rolfsii | Sclerotinia sclerotiorum | Thielaviopsis basicola | Phytophthora cactorum | Fusarium culmorum | Fusarium oxysporum | Fusarium solani f. pisi |
|---|---|---|---|---|---|---|---|---|---|
| [structure with C₇H₅, CO—O—N=C, CH₃, NH—CO—O—CH₃] (10) | (a) (b) | 10 100 | + + | + + | 0 0 | + + | 0 0 | + + | + + |
| [structure with CH₃ groups] (16) | (a) (b) | 10 100 | + + | 0 0 | 0 0 | — — | — 0 | + 0 | + + |
| [structure (17)] | (a) (b) | 10 100 | + + | — 0 | 0 0 | | 0 0 | 0 0 | + + |

EXAMPLE 11

Seed dressing test/bunt of wheat (seed-born mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia tritici* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table.

TABLE 11
Seed dressing test/bunt of wheat

| Active compound | | Concentration of active compound in the dressing in percent by weight | Applied amount of dressing in g./kg. seed | Spore germination in percent |
|---|---|---|---|---|
| Non-dressed | | | | >10 |
| [Zn dithiocarbamate structure] (known) | (A) | 10 | 1 | 5 |
| [benzimidazole structure with CO—O—N=C(CH₃)₂ and NH₂] | (3) | 10 30 | 1 1 | 0.05 0.005 |

TABLE 11—Continued

Seed dressing test/bunt of wheat

| Active compound | | Concentration of active compound in the dressing in percent by weight | Applied amount of dressing in g./kg. seed | Spore germination in percent |
|---|---|---|---|---|
| [benzimidazole with N-CO-O-N=C(C₂H₅)(CH₃) and 2-NH-CO-O-CH(CH₃)₂] | (13) | 10 | 1 | 0.000 |
| | | 30 | 1 | 0.000 |
| [benzimidazole with N-CO-O-N=C(CH₃)₂ and 2-NH-CO-O-CH₃] | (9) | 30 | 1 | 0.000 |
| [benzimidazole with N-CO-O-N=C(CH₃)₂ and 2-NH-CO-O-C₂H₅] | (11) | 30 | 1 | 0.000 |
| [benzimidazole with N-CO-O-N=C(CH₃)₂ and 2-NH-CO-O-CH(CH₃)₂] | (12) | 30 | 1 | 0.000 |
| [benzimidazole with N-CO-O-N=C(CH₃)₂ and 2-NH-CO-O-C₄H₉] | (14) | 30 | 1 | 0.000 |

Preparation of the novel compounds is illustrated hereinbelow. Some of the compounds decompose at elevated temperature and therefore have no defined melting points. However, their infra-red spectra show characteristic absorption bands. Thus, in the infra-red spectra of the 1-carboxylic acid ketone oxime O-esters of the formula (I) in which $R^1$ stands for hydrogen, there is observed in the range from 1,740 to 1,780 cm$^{-1}$ a strong carbonyl band or a double band with maxima lying close together, accompanied by a weaker absorption band at approximately 1,660 cm$^{-1}$; the N-H absorption lies, in general, at 3,400 cm$^{-1}$. Compounds of the formula (I) in which $R^1$ stands for alkoxycarbonyl or alkenoxycarbonyl group show in the infrared spectrum one carbonyl band or two (in most cases very distinctly separated) carbonyl bands in the range from 1,730 to 1,820 cm$^{-1}$. The N-H absorption lies mostly in the region around 3,350 cm$^{-1}$ and is distinctly broadened. Many compounds of this type show strong bands at approximately 1,540 or 1,650 cm$^{-1}$. Finally, compounds of the formula (I) in which $R^1$ stands for CO—$R^6$ have two carbonyl bands, the amide band at approximately 1,700 cm$^{-1}$ and the carbonyl oxime ester band at approximately 1,750 cm$^{-1}$.

EXAMPLE 12

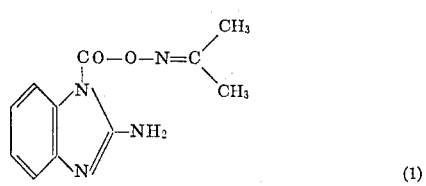

(1)

133.2 g (1 mole) of 2-aminobenzimidazole and 138 g of powdered potassiumcarbonate were introduced at 0°C into 2.3 liters of acetone. There were added dropwise, with strong stirring and over a period of 150 minutes, 135.5 g (1 mole) of acetone oxime O-carbonic acid ester chloride as a 40% strength solution in methylene chloride. Stirring was afterwards effected for one hour at 0°C and a further hour at 14°C. After 15 hours, the crystals were filtered off with suction, washed with 200 ml of cold acetone, and treated with cold water until the wash liquid was chloride-free; this was followed by drying at 40°C in a high vacuum. The yield was 172 g, that is 74% of theory, of 2-aminobenzimidazole-1-carboxylic acid acetone oxime ester.

The IR spectrum in KBr showed the carbonyl band at 1,760 cm$^{-1}$ and a weak N-H band at 3,425 cm$^{-1}$.

In analogous manner, there were prepared:

EXAMPLE 13

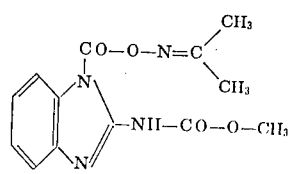

(9)

38.5 g (0.2 mole) of N-(benzimidazole-2-yl)-carbamic acid methyl ester, 200 ml of water, and 460 ml of alcohol-free chloroform were provided at 0°C

| Compound No. | Formula | Infra-red spectra, carbonyl and N-H band, other properties |
|---|---|---|
| 2 | | N-H 3,425 cm.$^{-1}$ (in KBr); CO 1,752 cm.$^{-1}$. |
| 3 | | N-H 3,430 cm.$^{-1}$ (in KBr); CO 1,750 plus 1,760 cm.$^{-1}$. M.P. 145-6° C. (decomposition). |
| 4 | | N-H 3,425 cm.$^{-1}$ (in KBr); CO 1,710 cm.$^{-1}$. |
| 5 | | N-H 3,425 cm.$^{-1}$ (in KBr); CO 1,740 cm.$^{-1}$. |
| 6 | | N-H 3,430 cm.$^{-1}$ (in KBr); CO 1,748 cm.$^{-1}$. |
| 7 | | N-H 3,425 cm.$^{-1}$ (in KBr); CO 1,745 cm.$^{-1}$. |
| 8 | | N-H 3,430 cm.$^{-1}$ (in KBr); CO 1,755 cm.$^{-1}$. | and 0.244 mole of acetone oxime O-chloroformic acid ester was added as raw solution in methylene chloride. Stirring was effected and aqueous potassium carbonate solution was added dropwise so that the pH of the mixture did not rise above 7 (towards the end of the reaction, not above 8). The organic phase was separated, filtered, washed once with water and dried over sodium sulfate. After addition of about 100 ml of dibutyl ether, chloroform and methylene chloride were evaporated off in a vacuum. The 2(methoxy-carbonylamino)-benzimidazole-1-carboxylic acid acetone oxime ester crystallized out. The crystals were filtered off with suction, washed with dibutyl ether and dried at 50°C under a pressure of 0.1 mm Hg. The yield was 40.5 g, i.e., 71% of theory. The melting point was 143° to 148°C (with decomposition); after recrystallization from methylene chloride/toluene, it was 147° to 150°C. The IR spectrum in KBr showed carbonyl bands at 1,750 and 1,772 cm$^{-1}$ and N-H bands at 3,260 and 3,300 cm$^{-1}$.

In analogous manner, there were prepared:

| Compound No. | Formula | Infra-red spectra, carbonyl and N-H band, other properties |
|---|---|---|
| 10 | | CO 1,750 plus 1,762 cm.$^{-1}$ (in KBr). |
| 11 | | N—H 3,280 cm.$^{-1}$ (in KBr); CO 1,768 cm.$^{-1}$. M.P. 121-3° C. |
| 12 | | CO 1,745 plus 1,800 cm.$^{-1}$ (in KBr). M.P. 130.5-133° C. |
| 13 | | CO 1,735 plus 1,775 cm.$^{-1}$ (in KBr). M.P. 108-116° C. |
| 14 | | N—H 3,330 cm.$^{-1}$ (in KBr); CO 1,763 cm.$^{-1}$. M.P. 97-99.5° C. |
| 15 | | N-H 3,290 cm.$^{-1}$ (in KBr); CO 1,773 cm.$^{-1}$. M.P. 68.5-72.5° C. |
| 16 | | N-H 3,330 cm.$^{-2}$ (in KBr); CO 1,755 plus 1,765 cm.$^{-1}$. M.P. 121-8° C. |

| Compound No. | Formula | Infra-red spectra, carbonyl and N-H band, other properties |
|---|---|---|
| 17 | (structure) | N-H 3,325 cm.$^{-1}$ (in KBr); CO 1,748 plus 1,773 cm.$^{-1}$. M.P. 112.5-119° C. |
| 18 | (structure) | N-H 3,310 cm.$^{-1}$ (in KBr); CO 1,743 plus 1,770 cm.$^{-1}$. M.P. 92-96°C. |
| 19 | (structure) | N-H 3,295 cm.$^{-1}$ (in KBr); CO 1,700 plus 1,745 cm.$^{-1}$. M.P. 142-6° C. |
| | (Prepared from 2-acetamido-benzimidazole and acetone oxime O-chloroformic acid ester) | |
| 20 | (structure) | N-H 3,330 cm.$^{-1}$ (in CHCl$_3$); CO 1,760 cm.$^{-1}$. M.P. 125-130° C. |
| 21 | (structure) | N-H 3,330 cm.$^{-1}$ (in CHCl$_3$); CO 1,770 cm.$^{-1}$. M.P. 143-146° C. |

It will be appreciated that the instant specification and examples are set forth by way of illustration and not limitation, and that various modifications and changes may be made without departing from the spirit and scope of the present invention.

What is claimed is:

1. A 2-aminobenzimidazole-1-carboxylic acid ketone oxime ester of the formula

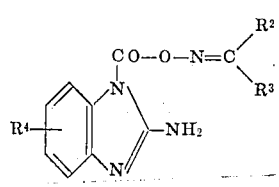

in which

R$^2$ is lower alkyl or phenyl,
R$^3$ is lower alkyl, or
R$^2$ and R$^3$ together are alkylene of 4 to 10 carbon atoms, and
R$^4$ is hydrogen or alkyl of up to 8 carbon atoms.

2. A compound according to claim 1 in which R$^2$ and R$^3$ each is methyl or ethyl, or together are butylene or pentylene; and R$^4$ is hydrogen, methyl or butyl.

3. The compound according to claim 1 wherein such compound is 2-aminobenzimidazole-1-carboxylic acid acetone oxime ester of the formula

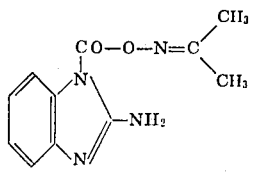

4. The compound according to claim 1 wherein such compound is 2-amino-5-methylbenzimidazole-1-carboxylic acid methylisobutylketone oxime ester of the formula (structure)

5. The compound according to claim 1 wherein such compound is 2-amino-5-methylbenzimidazole-1-carboxylic acid acetone oxime ester of the formula

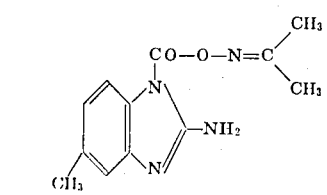

6. The compound according to claim 1 wherein such compound is 2-amino-5-methylbenzimidazole-1-carboxylic acid cyclohexanone oxime ester of the formula

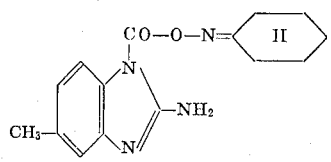

7. The compound according to claim 1 wherein such compound is 2-aminobenzimidazole-1-carboxylic acid cyclohexanone oxime ester of the formula

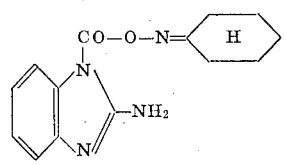

8. The compound according to claim 1 wherein such compound is 2-aminobenzimidazole-1-carboxylic acid propiophenone oxime ester of the formula

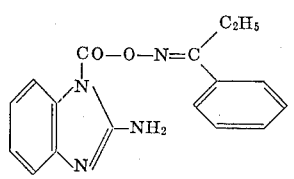

9. The compound according to claim 1 wherein such compound is 2-amino-5-methylbenzimidazole-1-carboxylic acid propiophenone oxime ester of the formula

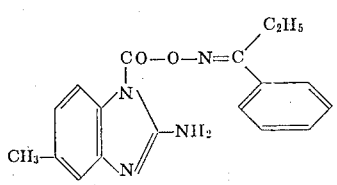

10. The compound according to claim 1 wherein such compound is 2-aminobenzimidazole-1-carboxylic acid methylethyl ketone oxime ester of the formula

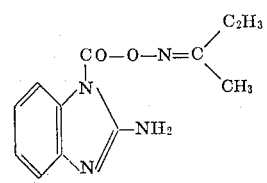

* * * * *

UNITED STATES PATENT OFFICE
CERTIFICATE OF CORRECTION

Patent No. 3,856,811                    Dated    December 24, 1974

Inventor(s)    Werner Daum et al        (Page 1 of 2)

It is certified that error appears in the above-identified patent and that said Letters Patent are hereby corrected as shown below:

Col. 1, line 29, cancel "published" and substitute -- Published Specification --.

Col. 2, Compound (Ib), correct structural formula to read as follows:

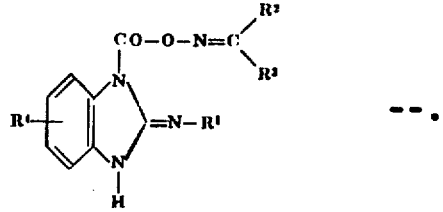

Col. 5, line 59, correct spelling of "cichoracearum"

Col. 5, line 62, correct spelling of "sasakii".

Col. 6, line 10, correct spelling of "cactorum".

Col. 8, Table 1, Compound (9), correct structural formula to read as follows:

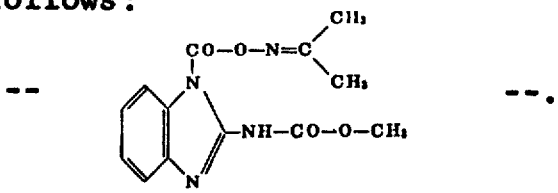

Col. 10, line 43, change "take" to -- takes --.

Col. 11, line 49, cancel "apply" and substitute -- apple --.

UNITED STATES PATENT OFFICE
CERTIFICATE OF CORRECTION

Patent No. 3,856,811    Dated December 24, 1974

Inventor(s)    (Page 2 of 2)

It is certified that error appears in the above-identified patent and that said Letters Patent are hereby corrected as shown below:

Col. 12, Table 4, in the title - correct spelling of "Podosphaera".

Col. 14, Table 5, in the heading of last column of Table, cancel "0 00039%" and substitute -- 0.00039% --.

Col. 21, Table 9, cancel structural formula (9) and substitute

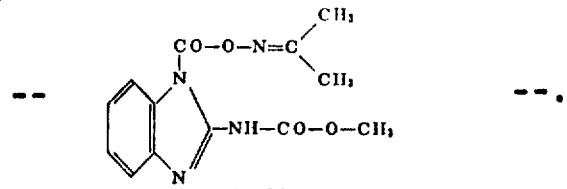

--.

Col. 25, Table 10, Compound (13), correct structural formula to read as follows:

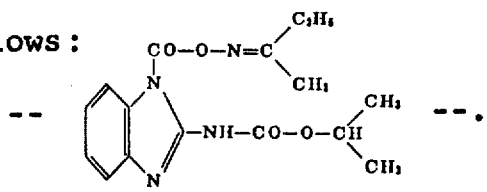

--.

Col. 29, Table 11, Compound (11), correct structural formula to read as follows:

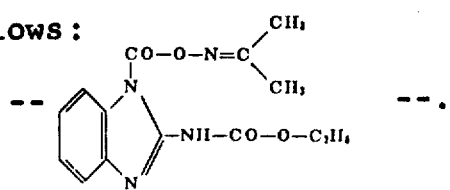

--.

Col. 31, Compound (4), cancel "1,710" and substitute -- 1,740 --.

Col. 31, Compound (5), cancel " + " under "$NH_2$".

Col. 38, Claim 10, in the structural formula, cancel "$C_2H_3$" and substitute -- $C_2H_5$ --.

Signed and sealed this 13th day of May 1975.

(SEAL)
Attest:

RUTH C. MASON
Attesting Officer

C. MARSHALL DANN
Commissioner of Patents
and Trademarks